UNITED STATES PATENT OFFICE 2,387,304

STABILIZATION OF TERPENE PRODUCTS

Donald H. Sheffield, Wilmington, Del., assignor to Hercules Powder Company, Wilmington, Del., a corporation of Delaware No Drawing. Application October 2, 1941, Serial No. 413,295

8 Claims. (Cl. 260—631.5)

This invention relates to a method for treating oxidized terpene compounds and more particularly it relates to a method for rendering stable oxidized terpene compounds which tend to undergo spontaneous exothermic reactions.

In the processing of terpene hydrocarbon fractions and especially in the chemical conversion of such materials to terpene alcohols there are obtained by-products which chiefly comprise monocyclic terpene hydrocarbons of limited usefulness. It has recently been found that such by-products can be converted to much more useful products by oxidation as with atmospheric oxygen. However, oxidation is accompanied by the formation of highly unstable materials. These unstable components of the oxidized terpenes tend to undergo spontaneous exothermic reactions upon warming and in some cases a dangerously violent reaction ensues. Their presence has prevented safe practical use of the oxidized terpenes.

Now in accordance with this invention, it has been found that by subjecting unstable oxidized monocyclic terpenes to the action of a reducing agent, the dangerous components can be eliminated safely. The unstable material is treated with a reducing agent until components capable of spontaneous exothermic reaction are substantially eliminated. The process will comprise mixing a reducing agent with the unstable oxidized terpene mixture and will usually comprise warming the oxidized terpenes with the reducing agent. The treatment will, in general, be continued with control of the temperature until the unstable material has reached a condition in which heating to 120° C. will no longer bring about exothermic reaction within the terpene product.

The method in accordance with this invention is applicable to oxidized terpenes or terpene mixtures which are characterized by instability of the type which leads to spontaneous exothermic reaction entirely within the material itself. Instability of this nature is readily determined by heating a small quantity of material to a temperature of about 120° C. and noting whether appreciable evolution of gas occurs or whether a sharp temperature rise indicating an exothermic reaction occurs at the said temperature or during heating to the said temperature. The method in accordance with this invention is particularly directed to unstable products of this nature which are derived by oxidation with pure or diluted oxygen gas, for example, with air, of monocyclic terpene hydrocarbon fractions with a boiling point or boiling range between about 170° C. and about 195° C. Such fractions will usually contain one or more compounds of the group represented by dipentene, limonene, alpha-terpinene, beta-terpinene, terpinolene, 1-4 cineol, 1-8 cineol, etc. The process is especially valuable in the treatment of fractions containing appreciable portions of terpinolene since it has been found that terpinolene is outstanding among terpenes in its ease of oxidation by gaseous oxygen and also in its tendency to form unstable compounds.

Typical unstable oxidized terpene compounds are those obtained by air oxidation at, for example, a temperature between about 0° C. and about 85° C. and especially at temperatures between about 30° C. and about 60° C. of such commercial terpene cuts as those known as "Solvenol" and "Bysol." These materials contain in variable quantities the particular terpenes hereinabove mentioned. Bysol is characterized by a content of terpinolene which is above about 25%. The product formed by air-oxidation of terpenes or terpene fractions of this nature will, in typical cases, comprise about 15 to about 30% of water-soluble material of an oxygenated terpene character, about 40 to about 65% of a steam distillable fraction consisting mainly of terpene hydrocarbons having boiling points above about 170° C., and about 20 to about 50% of steam distillation residue which is a viscous liquid or semi-liquid relatively rich in oxygen and comprises polymeric terpenic compounds.

Reducing agents in general are suitable for stabilizing the unstable oxidized terpenes in the method according to this invention. Hydrogen has been found, for example, to be suitable and will, in general, be utilized under active reducing conditions. Thus, hydrogen in the presence of a hydrogenation catalyst such as nickel, platinum, palladium and the like, or hydrogen as formed at the cathode or in a cathode chamber of an electrolytic cell, or hydrogen in the nascent state as formed by chemical reaction, shortly eliminates unstable components of the oxidized terpenes treated therewith. Metals having a position above hydrogen in the electro-chemical series are also effective and will be utilized under reducing conditions, that is, in the presence of substances capable of reacting therewith to form hydrogen. Thus, strongly reducing metals such as sodium and potassium will preferably be used in the presence of small quantities of moisture or an alcohol. Calcium may be used in the presence of water. Less active metals, for example, magnesium, aluminum, zinc, iron, cadmium and the like, are preferably used in the presence of an acid such as acetic acid, sulfuric acid, hydrochloric acid and the like.

Compounds of a multi-valent element in a reduced state are also quite suitable as reducing agents. Thus, sulfur dioxide, sulfurous acid and the metal sulfites and bisulfites, for example, sodium bisulfite, calcium bisulfite, potassium bisulfite, lithium bisulfite, and the like, are suitable. Other compounds containing sulfur in a reduced state, for example, sodium hydrosulfite, hydrogen sulfide, thiosulfate and the like, may be used. Other reducing agents of this nature are, for example, ammonia, titanium trichloride, vanadous sulfate, cerous sulfate, ferrous sulfate, and the like. Organic reducing agents such as hydroquinone, phenyl beta-naphthylamine, phenyl alpha-naphthylamine, diphenylamine, pyrogallol, and ketone-amine condensates like the acetone-aniline condensates, may also be used.

In carrying out the process according to this invention the reducing agent is mixed as such or in solution into the unstable oxidized terpene to be treated. Vigorous agitation is desirable. The process may comprise mere admixture but will usually include moderate warming with the reducing agent. Temperatures of treatment between about 0 and about 90° C. may be utilized but preferably the temperature will be controlled so as to hold the mixture being treated between about 40 and about 70° C. The terpenic material is treated with the reducing agent until unstable components have been reduced to a safe proportion or have been substantially eliminated, i. e., until a stable product which may be safely handled and stored is obtained.

Where the reducing agent is in gaseous form as is the case with sulfur dioxide, hydrogen sulfide, hydrogen and ammonia, atmospheric or elevated pressures may be employed. The gases may be bubbled through a layer of the material being treated or may be passed in continuous processes concurrently or counter-currently through a column through which the oxidized terpene is being passed. Where catalysts such as hydrogenation catalysts bring about reducing conditions, i. e., activity of the hydrogen, they may be mixed with the material being treated or may form a bed through which the reducing agent and the material being treated are passed. Where a metal is used as the reducing agent, it will be well agitated with the material being treated and will be used in association with small amounts of moisture or with an acid creating the desired reducing condition. Metals will preferably be in a form with a large surface, i. e., a powdered, granulated, or spongy form, or in the form of shavings, wire, etc. Where the reducing agent is an alkali metal bisulfide or other salt of a reducing nature, the agent is preferably applied in aqueous solution.

The amount of reducing agent utilized will vary with the nature of the agent employed and with the quantity of unstable material present. A quantity between about 0.1% and about 100% by weight of the terpenic material present will be utilized in most cases; however, considerably larger quantities of reducing agent may be used where rapid action is desired. At the end of the treatment the reducing agent and any associated catalyst, acid, solvent, etc., may be removed if desired. However, in many cases all or a portion of the reducing agent may be left with the oxidized terpene. Where there is a tendency for the formation of a complex of the reducing agent with terpenic material present, for example, a complex formed by a bisulfite and a terpenic aldehyde, it is desirable to eliminate the complex, for example, by the addition of aqueous alkali.

The method in accordance with this invention stabilizes unstable oxidized terpenes with practically a 100% yield since the unstable materials are converted to useful terpenic derivatives similar in nature to stable components of the mixture. Instability may be tested by heating a sample to 120° C. as hereinbefore mentioned Instability may also be tested by noting the ability of the material to liberate free iodin upon being heated with an acidified alkali metal iodide solution. It is characteristic of unstable products that they liberate iodin under these conditions freely. The stabilized product is incapable of appreciable spontaneous exothermic reaction upon being heated and is also characterized by little or no iodin liberation upon heating with acidified aqueous alkaline metal iodides. Its iodin liberation value will not exceed the equivalent of 1% hydrogen peroxide.

The method in accordance with this invention is illustrated by the specific embodiments thereof in the following examples.

*Example 1*

A monocyclic terpene by-product cut consisting chiefly of terpinolene, terpinenes, dipentene, with small amounts of limonene and cineols, was oxidized by blowing air through the liquid terpene mixture while maintaining the material at a temperature of 50° C. until the specific gravity of the material at 15.5° C. increased to 1.027. This material was quite unstable as shown by its ability to liberate iodin to an extent equivalent to a 3.6% solution of hydrogen peroxide when treated with acidified sodium iodide.

The unstable material in a quantity of 200 parts by weight was mixed with 20 parts of Raney nickel catalyst wet with methanol and the mixture was agitated and treated with hydrogen gas in a rapid stream at atmospheric pressure while being vigorously agitated and held in a constant temperature oil bath maintained at 70° C. At the end of 6 hours of this treatment, the reaction mixture was filtered to recover stabilized oxidized terpenes. The product was found to have an iodin stability equivalent to 0.3% hydrogen peroxide.

*Example 2*

Unstable oxidized monocyclic terpenes of the type described in Example 1 were treated with titanium trichloride by vigorously agitating 100 parts by weight of the oxidized terpenes with 1000 parts by weight of aqueous solution containing 78 parts of the titanium trichloride. This mixture was agitated while under a blanket of carbon dioxide serving to create an inert atmosphere while adding 78 parts by weight of hydrochloric acid gradually. The temperature was allowed to rise to 60–70° C., cooling when necessary to prevent rapid rises and the temperature was then maintained at 60–70° C. for 1 hour. At the end of this period, agitation was discontinued and two layers were permitted to separate. The aqueous layer was drawn off and the terpene layer was washed with water until neutral to obtain the stabilized product.

*Example 3*

Substantially pure terpinolene was oxidized by reacting the terpinolene with oxygen under 40–50 lbs. per square inch pressure at a temperature controlled by cooling to no more than 50° C. until the increase in weight of the terpinolene was 25-27%. Two hundred parts of the resulting unstable oxidized product were treated by bubbling gaseous ammonia through the material while cooling to prevent rise in temperature to above 50° C. until a weight increase of 5-10% was obtained. The stable material so obtained represented the final product and required no modification for some uses. However, for applications in which the presence of free ammonia was found to be undesirable, a portion of the product was thoroughly washed with water. In this case, a stable water-insoluble product having no appreciable water-soluble components was obtained.

*Example 4*

The by-product monocyclic terpene mixture described in Example 1 was oxidized by blowing oxygen therethrough until the specific gravity rose to 0.995 while maintaining the temperature at 50° C. Two hundred parts of the unstable oxidized product so produced were placed in a stainless steel autoclave, equipped with a jacket for cooling or heating, with 6 parts of a catalyst consisting of 0.5% platinum supported on zirconium silicate as a carrier. The mixture obtained was then subjected to hydrogen at a pressure of 60 lbs. per square inch and its temperature maintained at 23° C., cooling when necessary, for a period of 15 hours with vigorous shaking of the autoclave. About 0.45 part by weight of hydrogen was found to have been absorbed. The product, which consisted of a dark stable liquid, was recovered by filtration.

*Example 5*

A terpene fraction boiling at above 170° C. obtained as a by-product in the hydration of crude turpentine to form terpineol and consisting chiefly of terpinolene, alpha-, beta-, and gamma-terpinenes, dipentene, limonene, menthenes, sabinene, and 1-4 and 1-8 cineols was oxidized with air at 60-70° C. until the specific gravity rose to 1.05. The unstable oxidized liquid product obtained in this manner in a quantity of 100 parts by weight was stirred vigorously for one hour with 75 parts by weight of a 20% aqueous solution of sodium bisulfite in a jacketed reaction vessel. The temperature was permitted to rise slowly to 60-70° C. and prevented from rising rapidly or rising above 70° C. by cooling. Agitation was discontinued and the mixture permitted to separate into two layers. The water-immiscible layer was recovered and washed with water to obtain a light colored stable product.

*Example 6*

The unstable oxidized terpene product described in Example 1 was stabilized by vigorously agitating 100 parts by weight of the material with 150 parts by weight of water and 20 parts of sodium hydrosulfite in a reaction vessel equipped with a cooling coil. An exothermic reaction took place making cooling necessary. The temperature was held at below about 80° C. by the cooling. At the end of the period of strong heat evolution, external heat was applied to maintain the temperature in the range of 60-80° C. for 1 hour. The mixture was then permitted to cool and the immiscible layers which formed were separated. The water-immiscible layer was recovered and washed with water to yield the stabilized product.

*Example 7*

One hundred parts of the oxidized terpene product described in Example 1, 13 parts of powdered zinc, and 200 parts of water were stirred in a jacketed vessel while 100 parts of 25% aqueous sulfuric acid were slowly added. The temperature was held to below 80° C. After initial heat evolution substantially ceased, the mixture was heated with steam to maintain a temperature between 60 and 80° C. for 1 hour. The mixture was then cooled and permitted to separate into layers. The oily layer was recovered and filtered, washed free from acid with water, and dried under carbon dioxide. A very light colored stable product was obtained.

*Example 8*

A by-product monocyclic terpene mixture, similar to that described in Example 1, was oxidized to form an unstable mixture in the manner described in Example 1.

Ten parts by weight of this unstable mixture were agitated with twenty-eight parts by weight of ferrous sulfate. The oxidized terpene fraction was stabilized immediately. Its odor was changed to a flowery, camphoraceous type. Ferrous sulfate was oxidized in this reaction.

The stabilized oxidized monocyclic terpene products obtained by the method in accordance with this invention are useful as solvents for resin, as solvents in paints and varnishes, and they may also be utilized to modify surface tension as detergent aids. Water-soluble portions are useful as softeners for paper, Cellophane, and other cellulose products.

What I claim and desire to protect by Letters Patent is:

1. A process for improving unstable oxidized monocyclic terpenes which comprises treating the said oxidized terpenes with hydrogen in contact with a nickel catalyst at a temperature between 0 and 90° C. until components capable of spontaneous exothermic reaction are substantially eliminated.

2. A process which comprises subjecting unsaturated monocyclic terpenes boiling above 170° C. to oxidation at a temperature below about 85° C. until an appreciable rise in specific gravity and in the weight of the terpenes has occurred, but discontinuing the oxidation before the terpenes become saturated with respect to oxygen, and then subjecting the said oxidized terpenes to the action of hydrogen in contact with a nickel catalyst at a temperature between about 0° C. and about 90° C. whereby the components capable of supporting a spontaneous exothermic reaction are substantially eliminated.

3. A process for improving unstable oxidized monocyclic terpenes which comprises treating the said oxidized terpenes with hydrogen in contact with a nickel catalyst at a temperature between about 40° C. and about 90° C. until components capable of spontaneous exothermic reaction are substantially eliminated.

4. A process for improving unstable oxidized monocyclic terpenes which comprises treating the said oxidized terpenes with hydrogen in contact with a nickel catalyst at a temperature between about 40° C. and about 70° C. until components capable of spontaneous exothermic reaction are substantially eliminated.

5. A process which comprises subjecting unsaturated monocyclic terpenes boiling above 170° C. to oxidation at a temperature below about 85°

C. until an appreciable rise in specific gravity and in the weight of terpenes has occurred, but discontinuing the oxidation before the terpenes become saturated with respect to oxygen, and then subjecting the said oxidized terpenes to the action of hydrogen in contact with a nickel catalyst at a temperature between about 40° C. and about 90° C., whereby the components capable of supporting a spontaneous exothermic reaction are substantially eliminated.

6. A process which comprises subjecting unsaturated monocyclic terpenes boiling above 170° C. to oxidation at a temperature below about 85° C. until an appreciable rise in specific gravity and in the weight of terpenes has occurred, but discontinuing the oxidation before the terpenes become saturated with respect to oxygen, and then subjecting the said oxidized terpenes to the action of hydrogen in contact with a nickel catalyst at a temperature between about 40° C. and about 70° C., whereby the components capable of supporting a spontaneous exothermic reaction are substantially eliminated.

7. A process which comprises subjecting unsaturated monocyclic terpenes boiling above 170° C. to air oxidation at a temperature of 50° C. until an appreciable rise in specific gravity and in the weight of terpenes has occurred, but discontinuing the oxidation before the terpenes become saturated with respect to oxygen, and then subjecting the said oxidized terpenes to the action of hydrogen in contact with a nickel catalyst at a temperature of 70° C., whereby the components capable of supporting a spontaneous exothermic reaction are substantially eliminated.

8. A process which comprises subjecting terpinolene to oxidation at a temperature below about 85° C. until an appreciable rise in specific gravity and in the weight of the terpinolene has occurred, but discontinuing the oxidation before the terpinolene becomes saturated with respect to oxygen, and then subjecting the oxidized terpinolene to the action of hydrogen in contact with a nickel catalyst at a temperature between about 40° C. and about 90° C., whereby the components capable of supporting a spontaneous exothermic reaction are substantially eliminated.

DONALD H. SHEFFIELD.